United States Patent [19]

Lamy

[11] 4,062,198

[45] Dec. 13, 1977

[54] METHOD AND APPARATUS FOR THE LAYING OF A SUBMERGED PIPELINE SUCH AS A SUBMARINE PIPELINE

[75] Inventor: Jacques Edouard Lamy, Fontenay-aux-Roses, France

[73] Assignee: C. G. DORIS (Compagnie Generale pour les Developments Operationels des Richesses Sous-marines), Paris, France.

[21] Appl. No.: 687,908

[22] Filed: May 19, 1976

[30] Foreign Application Priority Data

May 30, 1975 France ................................. 75.16961

[51] Int. Cl.² .............................................. F16L 1/00
[52] U.S. Cl. ........................................ 61/112; 61/109
[58] Field of Search .................. 61/112, 107, 108, 109

[56] References Cited

U.S. PATENT DOCUMENTS

| 3,086,369 | 4/1963 | Brown | 61/112 |
| 3,136,133 | 6/1964 | Perret | 61/112 |
| 3,311,132 | 3/1967 | McWilliams | 61/112 |
| 3,425,453 | 2/1969 | Fuller | 61/112 |

Primary Examiner—Jacob Shapiro
Attorney, Agent, or Firm—Laurence R. Brown

[57] ABSTRACT

A method and apparatus for laying a submerged pipeline, such as a submarine pipeline, on the bed of a body of water along a path which crosses a ditch in said bed in which there is a current transverse to the pipeline, the depth of the body of water being at a maximum in said ditch and said pipeline being drawn along said bed from a shore towards open water, wherein at least one ballast tube is integrally associated with the pipeline so that a portion of said pipeline with the associated ballast tube takes up a position within said ditch in substantially U-form, the ballast tube being filled partly with air and partly with water which collects in the portion of the ballast tube of substantially U-form whereby the apparent weight of the pipeline is increased solely with respect to the portion thereof located in said ditch, the water remaining in position in the portion of the ballast tube temporarily located within said ditch as the pipeline and the associated ballast tube move forward during the laying operation. An air circulation pipe may be associated with said ballast tube, being preferably located inside the ballast tube, said pipe placing the part of the space within said ballast tube near the front end thereof into communication with a source of air located on land.

12 Claims, 9 Drawing Figures

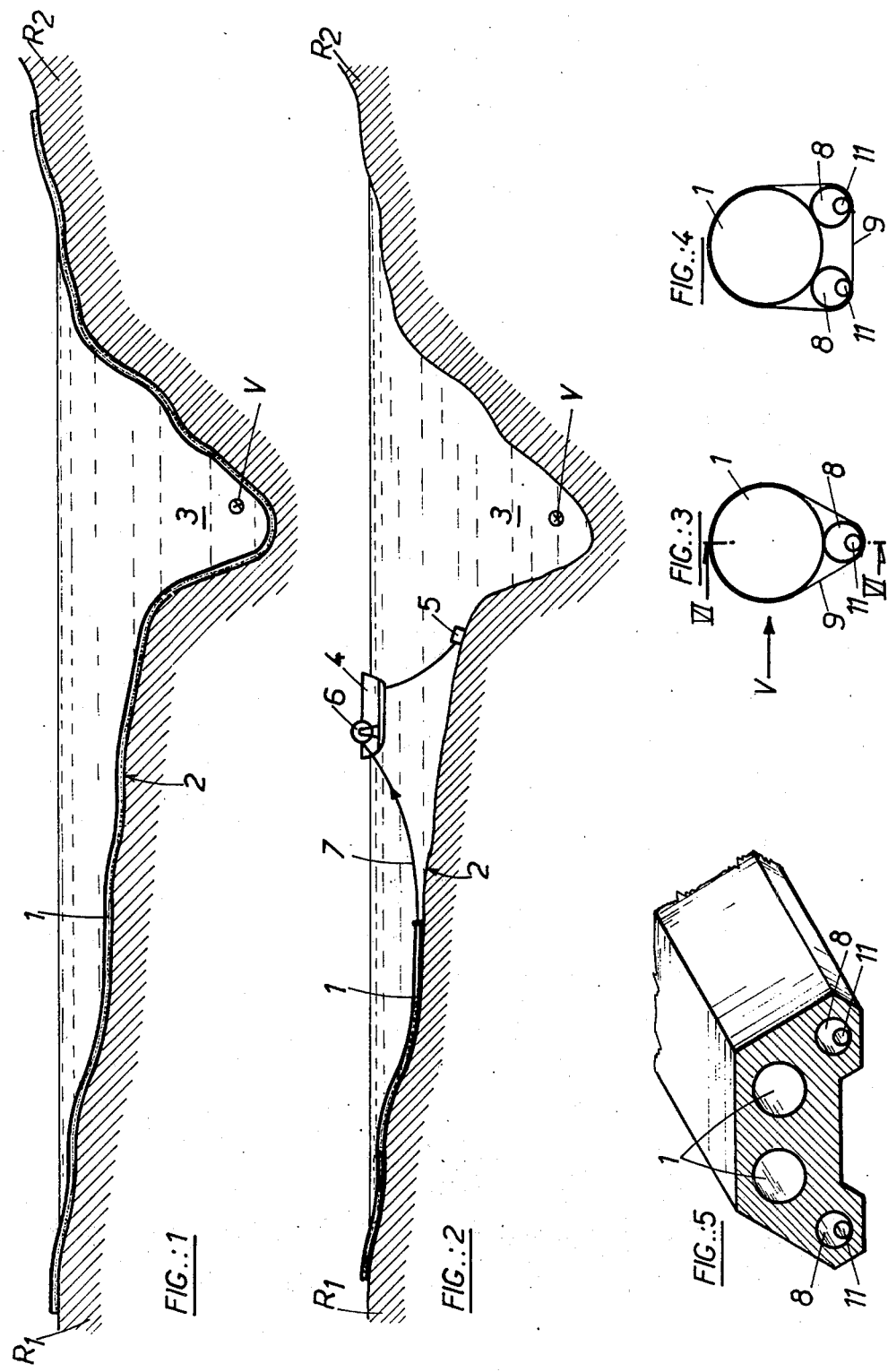

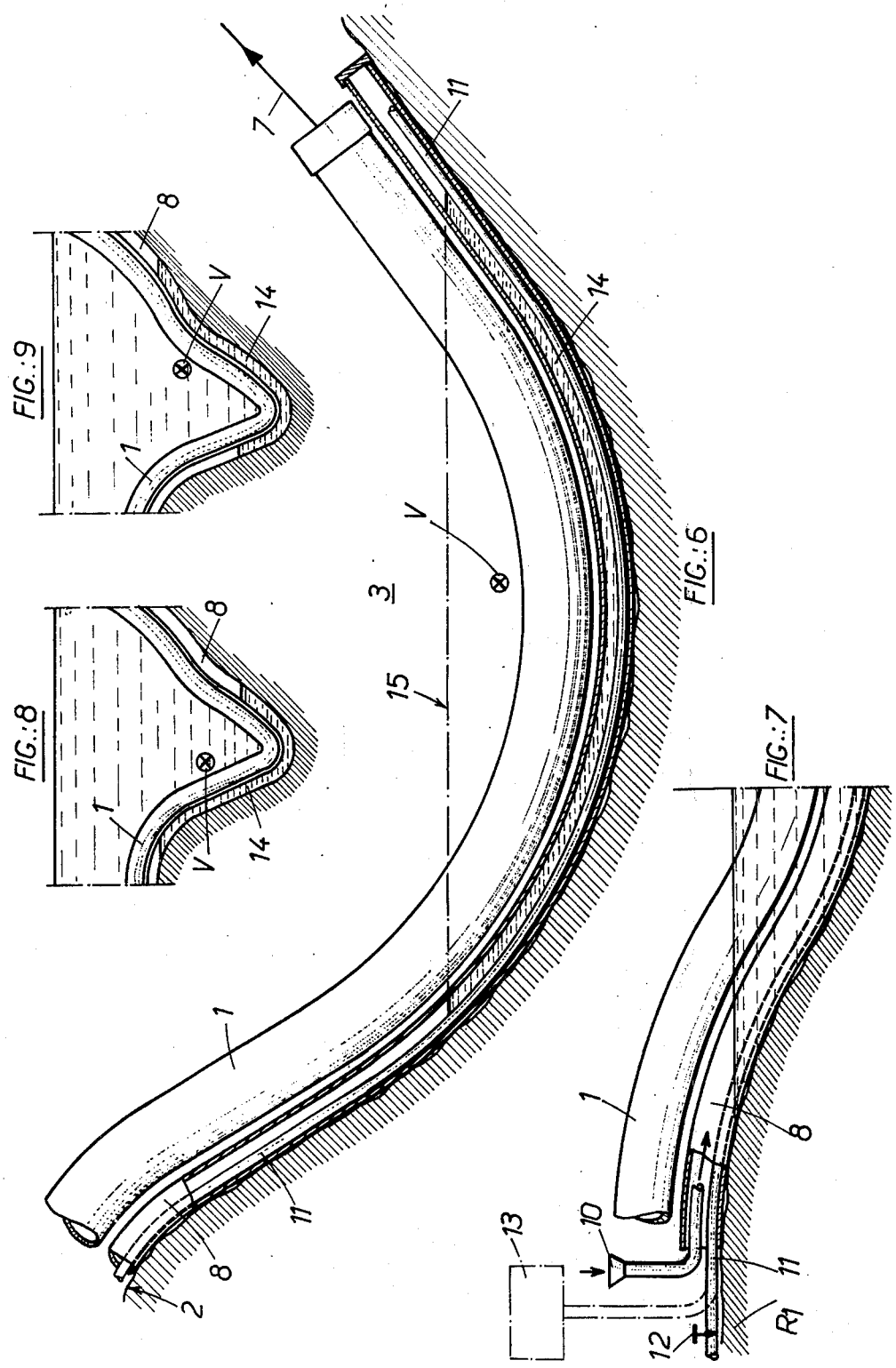

METHOD AND APPARATUS FOR THE LAYING OF A SUBMERGED PIPELINE SUCH AS A SUBMARINE PIPELINE

The present invention relates to the laying of submerged pipelines, such as submarine pipelines, intended, for example, to serve as oil ducts or gas ducts.

More particularly it concerns a method of laying a submerged pipeline on the bed of a body of water (sea, lake etc) of which the depth, along the path of the pipline, reaches a maximum in a ditch extending over a limited part of the path and in which a transverse current persists, i.e. transverse to the pipeline.

A known method of laying a pipeline on the bed of a body of water, of which the present invention is an improvement, consists in drawing the pipeline, resting on the bed of the body of water, from a shore thereof towards open water. The pipeline is composed of sections which are prefabricated and stored on land. In the laying operation, each new section is added to the near end, still on the shore, of the portion of the pipeline already submerged. The length of pipeline to be drawn thus increases as the laying operation progresses and correspondingly the traction effort to be exerted.

The largest part of this traction effort serves to overcome the friction arising between the pipeline and the bed and which is proportional to the force applied to the bed, i.e. to the apparent weight of the submerged pipeline. In order to reduce fricition, one then lightens the pipeline as far as possible (for example, by means of floats) which however is only possible in a calm body of water i.e devoid, in the vicinity of the bed, of strong transverse currents.

On the contrary, when such transverse currents exist, it is necessary to accept a greater apparent weight by ballasting the pipeline so that it may rest in a stable manner on the bed without deviating under the action of these currents. But then the traction effort to be exerted during the laying of the pipeline increases correspondingly and, if the ballasting is applied over the whole length of the pipeline, this effort could exceed the capacity of the traction devices or bring about the development of increased stresses in the pipeline. It is thus necessary, as far as possible, to limit the ballasting of the pipeline to the part or parts of its path in which the transverse currents prevail, by providing, for example, local detachable ballasting.

A problem arises, nevertheless, in the case where a transverse current prevails in a ditch which coincides with a limited part of the path of the pipeline but of great depth so that is is only accessible with difficulty. It is difficult, in this case to equip temporarily the part of the pipeline situated in this ditch with ballasting, said part constantly changing as the laying operation progresses. One solution would be to ballast the whole of the pipeline but this involves the difficulties indicated above.

The present invention seeks to resolve this problem by providing ballasting of limited extent for only that part of the pipeline situated at any given time in the ditch in which the transverse current prevails.

According to the invention, there is combined with the pipeline at least one continuous ballast tube, extending over the whole length of the pipeline and integral therewith, which is filled partly with air and partly with water which collects of the lower part of the ballast tube situated in the ditch so as to increase, solely in this limited part of its, path, the apparent weight of the pipeline resting on the bed and thus its resistance to deviation due to the effect of the transverse current prevailing in this ditch.

The present invention also includes an apparatus for carrying out said method, comprising a continuous ballast tube extending over the whole length of the pipeline and integral therewith, of which the front end, situated adjacent the front end of the pipeline, is closed, and of which the near end, situated on land adjacent the rear end of the pipeline is permanently in communication with the atmosphere and is also connected to a source of water.

According to a preferred embodiment, this apparatus also comprises an air circulation pipe extending over the whole length of the ballast tube and placing the part of the interior space of this tube, situated near its front end, into communication with a source of air situated on land, such as the atmosphere or an auxiliary source at superatmospheric or subatmospheric pressure.

As will be seen hereinafter, this arrangement has the advantage of allowing the position of the body of water contained in the lower part of the ballast tube to be adjusted with greater precision to the location of the transverse current prevailing in the ditch.

The following description with reference to the drawings, given as a non-limitative example, will enable the method of carrying the invention into effect to be better understood, the details of both the description and the drawings forming, it is understood, part of said invention.

FIG. 1 is a schematic view, in longitudinal section, of a submerged pipeline resting on the bed of a body of water having, over a part of the path of the pipeline, a great depth.

FIG. 2 is a schematic view, in longitudinal section, illustrating the general principle of the method of laying the pipeline illustrated in FIG. 1.

FIGS. 3 to 5 are views in transverse section (also in perspective in FIG. 5) illustrating various methods of combining a pipeline with at least one ballast tube extending over the whole length of the pipeline and suitable for carrying out the method of the invention.

FIG. 6 is a view in longitudinal section on the line V1-V1 of FIG. 3, showing a part of the pipeline equipped with its ballast tube and situated in the deep ditch in the body of water shown in FIGS. 1 and 2.

FIG. 7 is a view similar to FIG. 6 showing the rear part, situated on land, of the pipeline equipped with its ballast tube and means for supplying the latter with air and water.

FIGS. 8 and 9 are schematic views in longitudinal section showing two different positions of the volume of water contained in the lower part of the ballast tube situated in the ditch in the body of water.

In FIG. 1, reference numeral 1 shows a submerged pipeline, such as an oil duct or gas duct, resting on the bed 2 of a body of water, such as the sea or a lake, between two banks $R_1$ and $R_2$ of this body of water. The body of water has a variable depth along the path of the pipeline and the depth reaches a maximum in a deep channel or ditch 3 extending over a limited part of said path and in which a strong transverse current V prevails. FIG. 2 shows the pipeline 1 in the course of being laid.

This laying is effected by means of a floating device 4 anchored by means of moorings 5 away from the bank R, and equipped with a traction device, such as a winch on which is wound a traction cable 7 of which the end is attached to the front end of the pipeline 1.

The pipeline is composed of sections prefabricated and stored on land near the bank $R_1$. Each new section is attached (for example by welding) to rear end, still on the bank, of that part of the pipeline already submerged. The assembly of this part of the pipeline and the new section, resting all the time on the bed of the body of water, is then drawn towards open water, by means of a traction device 6 carried by the floating device, for a distance equal to that of a section. Traction is then stopped, the next section is added while moving the floating device 4 farther from the bank, drawing is recommenced, and so on long as there are sections to be added.

In order to reduce the friction between the pipeline and the bed 2 during the traction phase, the apparent weight of the pipeline is reduced by means of floatation devices which will be in question later. Its apparent weight should nevertheless still be sufficient for it to rest in a stable manner in calm water i.e. with little or no transverse current, which is the case over the whole path of the pipeline except for over the ditch 3 which forms only a limited part. For example, the apparent weight of the pipeline is everywhere of the order of 20 kg. per linear metre except of over the ditch 3.

There will now be described with reference to FIGS. 3 to 9 a method according to the invention of increasing locally, over the ditch 3, the apparent weight of the pipeline, so as to improve the stability thereof, i.e. its resistance to deviation, in the presence of a strong transverse current V prevailing in this ditch.

This method makes use of at least one continuous ballast tube 8 extending over the whole length of the pipeline 1 and integral therewith. FIG. 3 shows, for example, a single ballast tube connected to the pipeline, from place to place, by hands 9. Instead of a single ballast tube, one could add two ballast tubes to the same pipeline 1, as shown in FIG. 4.

The pipeline 1 can be monotubular or multitubular i.e. comprising a single servicible tube (as shown in FIGS. 3 and 4) or an assembly of parallel servicible tubes, integral with each other. FIG. 5 shows for example, a tubular pipeline forming part of a assembly comprising two servicible tubes 1 and two ballast tubes 8. All these tubes are coated with pitch or similar material ensuring the cohesion of the assembly and at the same time the protection of the tubes against corrosion. In FIGS. 6 to 9, there is assumed to be a monotubular pipeline equipped with a single ballast tube.

As shown in FIG. 6, the front end of the ballast tube 8 is tightly closed, as well as the front end of the pipeline 1 near which it is located. As shown in FIG. 7, the rear end of the ballast tube, situated on land in the region of the bank $R_1$, near to the rear end of the pipeline, is in permanent communciation with the atmosphere and is also connected to a source of water 10, such as a pump of which the suction orifice (not shown) is immersed in the water.

An air circulation pipe 11, of small diameter, extends along the whole of the ballast tube 8 and is preferably located inside the ballast tube, putting the part of the space inside this tube situated near its front end, into communciation with a source of air located on land. To this end, as shown in FIG. 7, the rear end of the pipe 11 communicates, either with the atmosphere via an obturating valve 12, or with an auxiliary source 13 of air at superatmospheric or subatmospheric pressure.

Before it reaches the deep ditch 3 (see FIG. 2), the pipeline is little or not subjected to the action of transverse currents and can therefore rest on the bed 2 with a relatively small apparent weight. The ballast tube 8, of which the rear end is in permanent communication with the atmosphere, is at that time simply full of air so as to act as a float which (if necessary in conjunction with otherfloats, not shown) gives the pipeline a reduced apparent weight, for example of the order of 20 kg/m.

When, due to the progress of the laying operation, the pipeline occupies the ditch 3, the part of the ballast tube 8 located in the ditch 3, the part of the ballast tube 8 located in the ditch is equivalent to a U-tube. The ballast tube is then partly filled with a certain volume of water from the source 10. This water is injected into the rear end of ballast tube, descends there along and finally accumulates in the lower part, located in the ditch, of the tube, where it remains permanently.

The total volume of water thus accumulated in the lower part of the ballast tube is indicated by reference numeral 14 in FIGS. 6, 8 and 9.

When water is injected into the ballast tube, the volume of air displaced by the injected volume of water escapes, at least in part, from the ballast tube via the circulation pipe 11 of which the obturator 12 is open. As shown in FIG. 6, the two free surfaces of the body of water 14 contained in the lower part of the ballast tube are thus established, in principle, at the same level and remain so until the end of the operation of laying the pipeline.

It will thus be seen that the apparent weight of the pipeline 1, which for example is between 20 kg/m and 40 kg/m, is increased only in the part of the pipeline situated alongside the volume of water 14 contained in the lower part of the ballast tube. The ballasting effected by this volume of water thus concerns only a limited part of the path of this pipeline, located in the ditch 3 in which the transverse current V persists.

One can thus give the pipeline a locally better stability i.e. an increased resistance to the effect of transverse deviation, solely in the limited part of its path where these qualities are required, and without the necessity of uselessly ballasting the pipeline over the rest of its path (which forms the most important part, in calm water). One does not thus uselessly increase the frictional forces to be overcome during the traction operations.

It has been assumed, in the case of FIG. 6, that the air pressures prevailing in the ballast tube respectively above the two free surfaces of the volume of water 14 contained in the lower part of this tube, are equal, so that these two free surfaces are established at the same level 15 corresponding to a certain middle position of the volume of water 14. But this is not essential and one can also vary this middle position by regulating the two recited air pressures with respect to each other.

One can, for example, when partially filling the ballast tube with water, prevent some of the air escaping from this tube to the atmosphere, by closing the valve 12 of the air circulation pipe 11. The air contained in the front part of the ballast tube is then compressed with respect to the air contained in the rear part of this part of this tube (which is at atmospheric pressure). The two free surfaces of the body of water 14 contained in the lower part of the ballast tube are then no longer at the same level and this body of water takes up a position indicated schematically in FIG. 8. As a variant, one could inject into the front of the ballast tube, via the air circulation pipe 11, air under pressure from the air source 13. Conversely, one could, assuming that the air source 13 is below atmospheric pressure, put the front part of the ballast tube under depression, so that the body of water contained in the lower part of this ballast tube would take up another position shown schematically in FIG. 9.

The air circulation tube 11 thus makes it possible, by adjustment of the air pressures that it establishes in one part of another of the body of water 14, to vary precisely the position of this body of water in the lower part of the ballast tube, depending upon the location of the tranverse current V in the ditch 3. FIGS. 6, 8 and 9 thus correspond to the cases in which a transverse current is located respectively in the middle, left, or right part of the ditch.

When the operations of laying the pipeline are finished, one can if desired, end by filling the ballat tube completely, so as to increase correspondingly the stability of the pipeline over the rest of its path, as a precautionary measure.

It goes without saying that the embodiments described are only examples and that it would be possible to modify them, notably by the substitution of technical equivalents, without departing from the scope of the invention. I claim:

1. A method of laying a submerged pipeline on the bed of body of water along a path which crosses a ditch in said bed in which there is a current transverse to said pipeline, the depth of the body of water being at a maximum in said ditch, which comprises integrally associating with said pipeline at least one continuous ballast tube extending over the whole length of said pipeline, drawing said pipeline with said ballast tube from a position on shore towards open water along the bed of the body of water , so that a portion of said pipeline and associated ballast tube lies within said ditch, filling said ballast tube partly with air and partly with water which collects in the part of said ballast tube located in said ditch and remains in that position as the ballast tube moves forward as the pipeline is. drawn towards open water, whereby the apparent weight of the pipeline is increased solely with respect to the portion of said pipeline located for the time being in said ditch and thus its resistance to the current in said ditch transverse to said pipeline.

2. A method according to claim 1, which comprises locating a portion of said pipe and associated ballast tube in said ditch in substantially U-form, introducing said water into said ballast tube to occupy said portion of substantially U-form with free water surfaces located in the arms of said portion, and regulating the air pressures in said ballast tube above said free water surfaces so as to adjust the position of the water in said portion of substantially U-form to the location of the transverse current in said ditch.

3. A method according to claim 1, which comprises locating a portion of said pipe and associated ballast tube in said water into said ballast tube to occupy said portion of substantialluy U-form with free water surfaces located in the arms of said portion, and equalising the air pressures in said ballet tube above said free water surfaces so that said free surfaces are at the same level.

4. Apparatus for use in laying a submerged pipeline by hauling the pipeline off from a shore on the bed of a body of water along a path which crosses a ditch in said bed with a fore end of the pipeline on said bed along said path past said ditch while a rear portion of the pipeline extends on the shore, comprising at least one ballast tube extending along the pipeline and having a closed end adjacent said fore end of the pipeline and an open rear end on the shore adjacent said rear portion of the pipeline, means fastening the ballast tube integrally to the pipeline, and means for feeding the ballast tube through said open end with a mass of liquid, whereby the mass of liquid will flow down to a lower region of the ballast tube which is located in the ditch together with an adjoining region of the pipeline for ballasting said adjoining pipeline region to resist an underwater current flowing in the ditch transversely to the pipeline.

5. Apparatus according claim 4, comprising a plurality of said ballast tubes.

6. Apparatus according to claim 4, wherein said pipeline is monotubular.

7. Apparatus according to claim 4, wherein said pipeline is multiitubular.

8. Apparatus for use in laying a submerged pipeline by hauling the pipeline off from a shore on the bed of a body of water along a path which crosses a ditch in said bed with a fore end of the pipeline on said bed along said path past said ditch while a rear portion of the pipeline extends on the shore comprising at least one ballast tube extending along the pipeline and having a closed end adjacent said fore end of the pipeline and an open rear end on the shore adjacent said rear portion of the pipeline, means fastening the ballast tube integrally to the pipeline, a pipe extending along the ballast tube opening in the ballast tube adjacent said closed end thereof and having a rear end on the shore adjacent said rear portion of the pipeline, means for feeding the ballast tube through said open end with a mass of liquid, and means for feeding said pipe with a gas at a predetermined pressure to position said mass of liquid in a region of the ballast tube which is located in a position of the ditch wherein an underwater current flows transversely to the pipeline.

9. Apparatus according to claim 8, wherein said predetermined pressure is atmospheric pressure.

10. Apparatus according to claim 8, wherein said predetermined pressure is a superatmospheric pressure.

11. Apparatus according to claim 8, wherein said predetermined pressure is a subatmospheric pressure.

12. Apparatus according to claim 8, wherein said tube is located inside said ballast tube.

* * * * *